Dec. 16, 1969  W. J. PELT  3,484,655
APPARATUS FOR CONTROLLING CONVEYING SYSTEMS AND THE LIKE
Filed Oct. 7, 1966  3 Sheets-Sheet 1
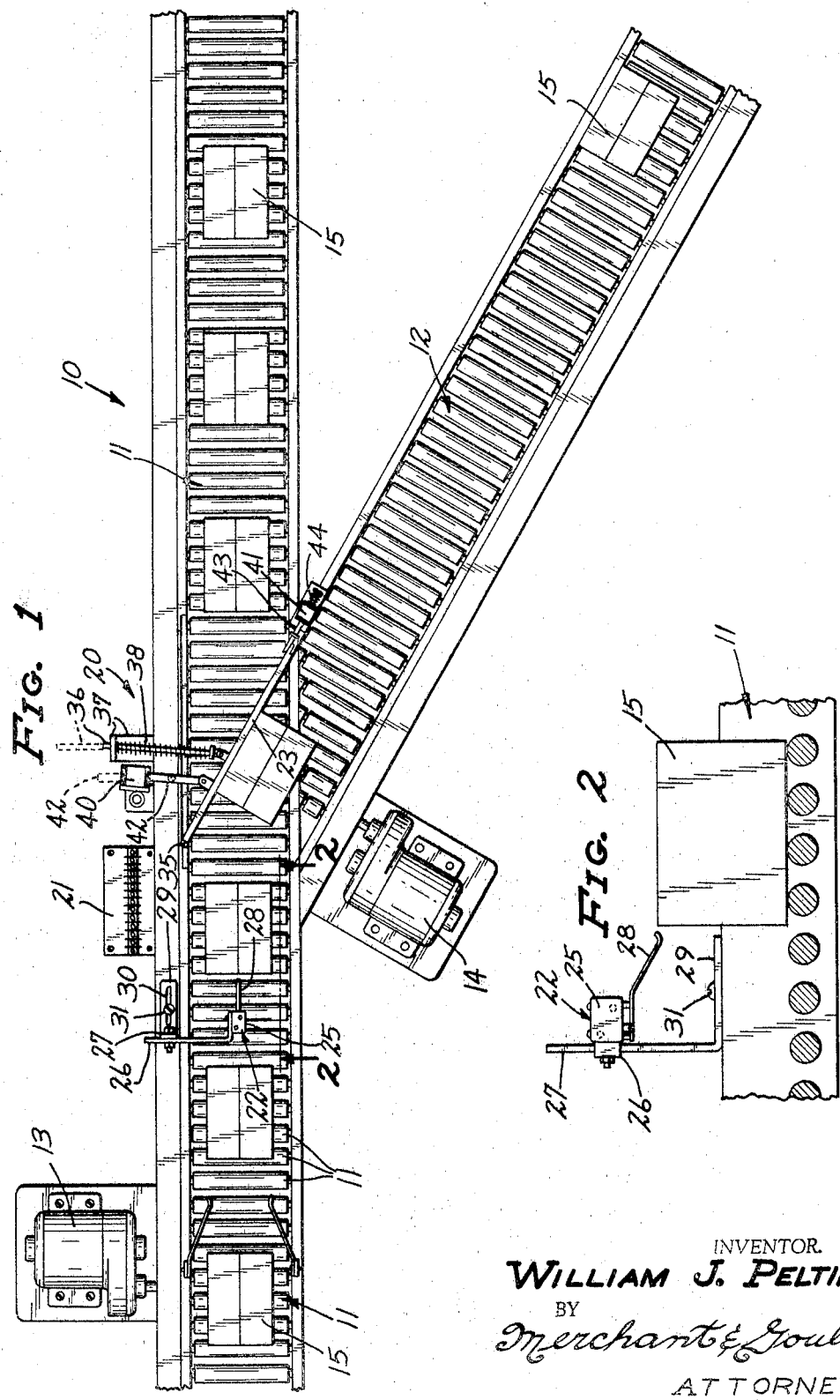
INVENTOR.
WILLIAM J. PELTIER
BY
Merchant & Gould
ATTORNEYS INVENTOR.
WILLIAM J. PELTIER
BY
Merchant & Gould
ATTORNEYS

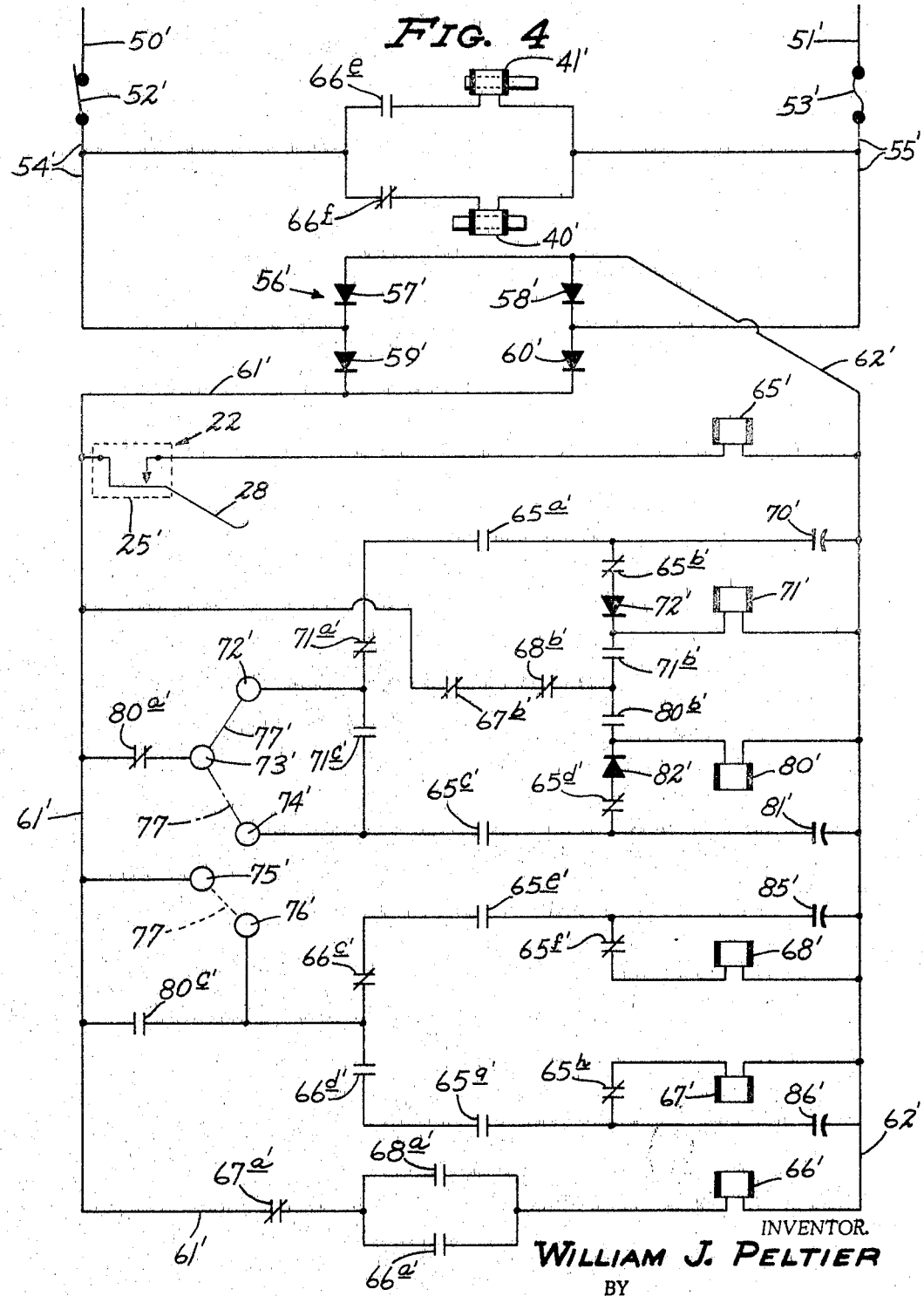

United States Patent Office 3,484,655
Patented Dec. 16, 1969

3,484,655
APPARATUS FOR CONTROLLING CONVEYING
SYSTEMS AND THE LIKE
William J. Peltier, 4646 Grand Ave. S.,
Minneapolis, Minn. 55409
Filed Oct. 7, 1966, Ser. No. 585,190
Int. Cl. H01h 47/00, 47/14
U.S. Cl. 317—137     5 Claims

ABSTRACT OF THE DISCLOSURE

A switch positioned to be actuated by articles moving down a conveying belt and attached to a plurality of relays each having a plurality of contacts connected to operate in a predetermined sequence so as to actuate solenoids and divert desired ones of said articles onto spur conveyors or the like. The desired ones of said articles are chosen by adjusting the sequence of said relays and associated contacts so that said solenoids are actuated each time a desired number of articles actuates said switch a similar number of times.

This invention pertains to apparatus for segregating objects by volume and more specifically to control apparatus which provides a signal or an impulse each time a specified number of objects pass a particular point in its path of travel, which signal or impulse is utilized to indicate or control the path of travel of the object.

It is an object of the present invention to provide a new and improved control apparatus.

It is a further object of the present invention to provide apparatus for indicating or controlling the movement of objects along a conveying system.

It is a further object of the present invention to provide apparatus which is quickly variable to operate on different numbers of objects passing along a conveying system.

It is a further object of the present invention to provide electrical control apparatus having relays therein which do not carry large currents and, therefore, have a greatly increased life expectancy.

It is a further object of the present invention to provide electrical control apparatus having relays therein, and new and novel locking circuits associated therewith.

It is a further object of the present invention to provide control apparatus which is extremely reliable and durable.

These and other objects of this invention will become apparent to those skilled in the art upon consideration of the accompanying specification, claims, and drawings.

Referring to the drawings, wherein like characters indicate like parts throughout the figures:

FIGURE 1 is a view in top plan of a conveying system having the apparatus of the present invention attached thereto;

FIGURE 2 is a sectional view as seen from the line 2—2 in FIGURE 1;

FIGURE 4 is a schematic diagram of electrical circuitry in a different embodiment of the present apparatus.

Figure 3:
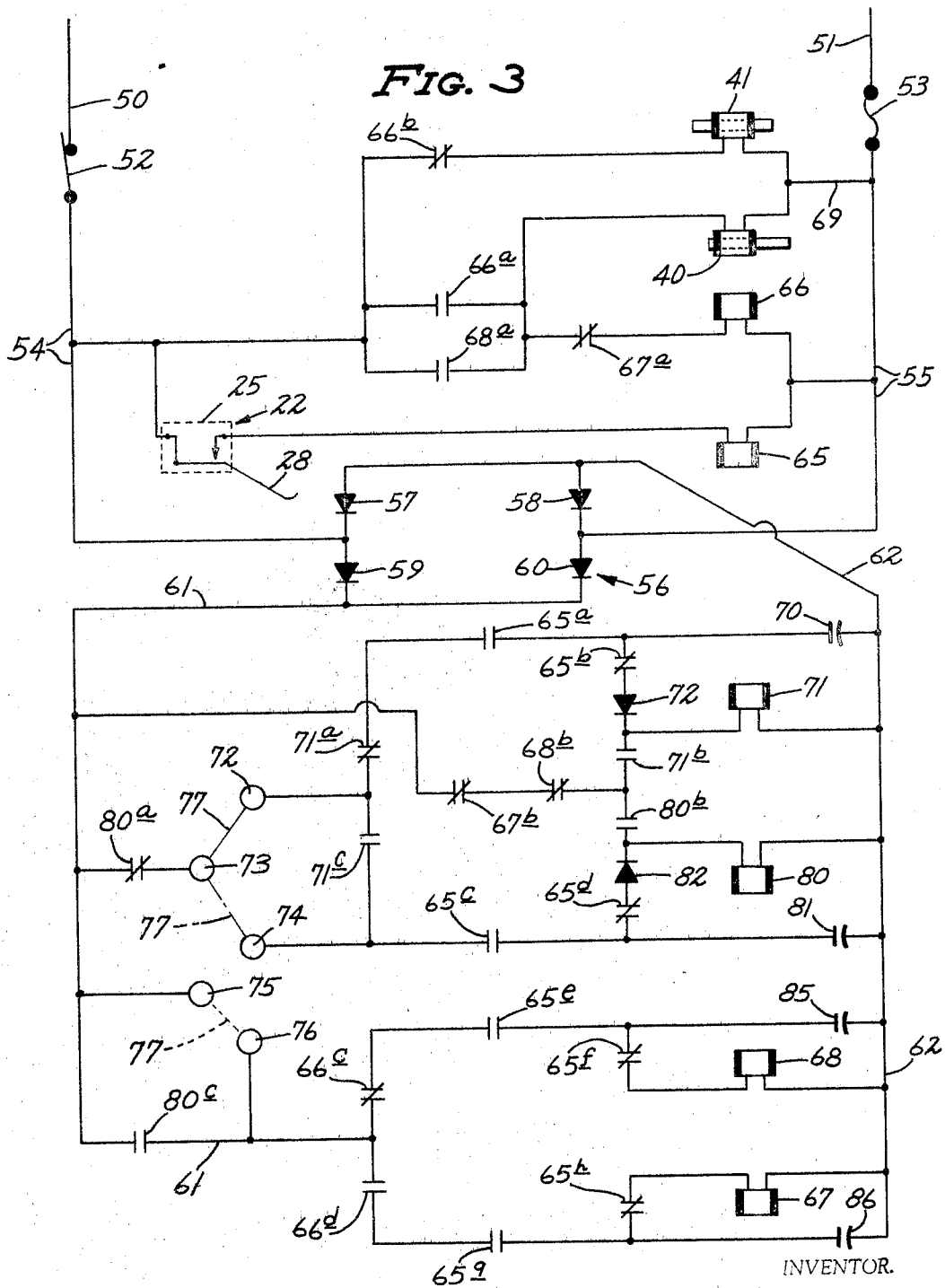
FIGURE 3 is a schematic diagram of the electrical circuitry of the present apparatus.

Referring to FIGURE 1, a conveyor system generally designated 10 has a main line 11 and a branch line 12. The main line 11 is activated by a motor 13 attached thereto in the usual manner and the branch line 12 is activated by a motor 14 attached in the usual manner. While the main line 11 and the branch line 12 are illustrated as a plurality of rollers placed in parallel spaced apart relationship, it should be understood that any conveying system, such as conveyor belts, etc., could be utilized with the present invention. The conveying system 10 moves objects, such as the boxes 15 from the left end in FIGURE 1 to the right end. The present apparatus generally designated 20 is mounted at the junction of the branch line 12 and the main line 11 and is utilized to periodically divert a predetermined number of the boxes 15 from the main line 11 to the branch line 12.

The control apparatus 20 includes an electronic control box 21, condition responsive means 22, and a diverting gate 23. In this embodiment the condition responsive means 22 is a microswitch 25 mounted at the end of an adjustable horizontally extended arm 26, which is in turn adjustably mounted on a vertically extending arm 27. The arm 27 is mounted at one side of the main line 11 just prior to the junction with the branch line 12. The horizontally extending arm 26 mounts the microswitch 25 at approximately the center of the main line 11 and slightly above the boxes 15. The microswitch 25 has an activating arm 28 attached thereto which extends downwardly a sufficient distance to engage the boxes 15 as they pass thereunder and cause the microswitch 25 to close. The horizontal arm 26 and the vertical arm 27 are relatively adjustable so that various sized packages or objects may be conveyed thereunder, and will activate the switch 25. The horizontal arm 27 is generally L-shaped with one portion 29 extending horizontally along the longitudinal axis of the main line 11. The portion 29 has a slot 30 therein and is fixedly attached to the main line 11 by a screw 31 passing through the slot 30. The horizontal position of the entire condition responsive means 22 is adjustable a distance equal to the slot 30 in the portion 29 so that the exact position of the box 15 at the time the microswitch 25 opens at the trailing edge thereof can be adjusted to allow the apparatus 20 to operate correctly when objects having different lengths are passing over the conveying system 10.

The diverting gate 23 has a hinged end 35 engaged at the outer edge of the main line 11 adjacent the junction with the branch line 12 and the gate 23 is adapted to pivot between a position parallel with the longitudinal axis of the main line 11 adjacent and parallel the outer of the branch line 12. In the first position the boxes 15 pass freely down the main line 11 while in the second edge thereof and a position parallel with the inner edge position the boxes 15 are diverted down the branch line 12. The gate 23 has a rod 36 pivotally attached to the rear surface thereof, which rod passes through an opening in a fixedly mounted bracket 37. The rod 36 acts as a guide for the movements of the gate 23 and has a compression spring 38 coaxially mounted thereover between the bracket 37 and the pivotal mounting of the rod 36 on the rear surface of the gate 23. The spring 38 serves to bias the gate 23 into the second position.

A first solenoid 40 and a second solenoid 41 operate as transducer means which serve to convert the signals from the electronic control box 21 to mechanical movement. The core 42 of the first solenoid 40 is pivotally attached to the rear surface of the gate 23 and serves to move the gate into the first position when the solenoid 40 is activated. The second solenoid 41 is mounted so that its core 43 moves horizontally and parallel to the longitudinal axis of the branch line 12. The core 43 of the solenoid 41 is positioned so that it maintains the gate 23 in the second position when the solenoid 41 is energized. The right end, in FIGURE 1, of the core 43 extends through the coil of the solenoid 41 and has a compression spring 44 coaxially therearound. The compression spring 44 biases the core 43 to the right and into a position in which it is normally disengaged from the gate 23. The solenoids 40 and 41 are connected into the circuitry in the electronic circuit box 21 such that the solenoid 40 is energized when the solenoid 41 is deenergized and vice versa. Thus, when the solenoid 40 is energized, the gate 23 is maintained in the first position, and when the solenoid 40 is deenergized the spring 38 moves the gate 23 to the second position where it is maintained by the solenoid 41, which is energized at that time. It should be understood that one of the solenoids 40 or 41 might open the gate 23 while the other solenoid shuts the gate 23 if this mechanical configuration is desired.

Referring to FIGURE 3, the electronic circuitry contained within the electronic circuit box 21 is illustrated in schematic form along with the microswitch 25 and the solenoids 40 and 41. One end of a first lead 50 and one end of a second lead 51 are adapted to be attached to a suitable source of power, such as 120 volts, 60 cycles. The other end of the lead 50 is attached to one contact of an off-on switch 52 and the other end of the lead 51 is attached to one end of a fuse 53. The other contact of the switch 52 has a lead 54 attached thereto, and the other side of the fuse 53 has a lead 55 attached thereto. A rectifying unit generally designated 56 is attached between the ends of the leads 54 and 55 in the following manner. Two diodes 57 and 58 have their anodes connected together in back-to-back relationship and the cathode of the diode 57 is attached to the line 54 while the cathode of the diode 58 is attached to the line 55. Similarly, a second pair of diodes 59 and 60 have their cathodes connected together in back-to-back relationship and the anode of the diode 59 is connected to the line 54 while the anode of the diode 60 is connected to the line 55. A pair of output leads 61 and 62 extend from the rectifying unit 56, and carry direct current to the remainder of the circuit. The lead 61 is connected to the junction of the cathodes of the diodes 59 and 60, while the lead 62 is connected to the junction of the anodes of the diodes 57 and 58. The microswitch 25 is connected in series with a relay coil 65 between the leads 54 and 55, so that closure of the switch 25 energizes the relay coil 65. A solenoid coil 66 attached in series with a pair of normally closed contacts 67a, which are associated with a relay coil 67 to be explained presently, and the parallel connection of two sets of normally open contacts 66a, associated with the relay coil 66, and 68a, associated with a relay coil 68 to be explained presently, are connected between the leads 54 and 55. The coils of the two solenoids 40 and 41 are connected in series with each other and a normally closed set of contacts 66b and the entire circuit is connected in parallel with the normally open contact 66a. A lead 69 is connected from between the coils 40 and 41 to the lead 55.

A capacitor 70, a pair of normally open contacts 65a, associated with the relay coil 65, and a pair of normally closed contacts 71a are connected in series between the lead 62 and a terminal 72. Terminal 72 and four other terminals 73 through 76 are located on the external surface of the electronic circuit box 21 so that appropriate connections may be readily made thereto. In the present embodiment a jumper lead 77 is connected between the terminals 72 and 73. A normally closed set of contacts 80a, associated with a relay coil 80, to be explained presently, are connected between the lead 61 and the terminal 73. Thus, with the jumper lead 77 between the terminals 72 and 73, a circuit is completed from the lead 61 through the contact 80a, the contact 71a, the contact 65a (when closed) and the capacitor 70 to the lead 62. The relay coil 71, a unidirectional current device, such as a diode 72, and a pair of normally closed contacts 65b are connected in series and in parallel with the capacitor 70. The diode 72 is connected so that current will flow from the capacitor 70 through the normally closed contact 65b, the diode 72, the relay coil 71, and back to the capacitor 70. A pair of normally open contacts 71b, a pair of normally closed contacts 68b, and a pair of normally closed contacts 67b are connected in series between the line 61 and the junction of the diode 72 and the relay coil 71. Thus, when the relay coil 71 is energized, a circuit is completed from the lead 61 through the contact 67b, the contact 68b, the contact 71b and the relay coil 71 to the lead 62. A second capacitor 81 is connected in series with a pair of normally open contacts 65c between the terminal 74 and the lead 62. A series connection of the relay coil 80, a unidirectional current device, such as a diode 82 similar to the device 72, and a pair of normally closed contacts 65d are connected in parallel with the capacitor 81. The diode 82 is connected so that current will flow from the capacitor 81 through the normally closed contact 65d, the diode 82, the relay coil 80, and back to the capacitor 81. A pair of normally open contacts 80b are connected from the junction between the contacts 68b and 71a to the junction between the diode 82 and the relay coil 80. A pair of normally open contacts 71c are connected between the terminal 74 and the terminal 72. A pair of normally open contacts 80c are connected between the terminals 75 and 76. A capacitor 85 is connected in series with a normally open pair of contacts 65e and a normally closed pair of contacts 66c between the terminal 76 and the line 62. A series connection of the relay coil 68 and a normally closed pair of contacts 65f is connected in parallel with the capacitor 85. A capacitor 86 is connected in series with a normally open pair of contacts 65g and a normally open pair of contacts 66d between the terminal 76 and the lead 62. A series connection of the relay coil 67 and a normally closed pair of contacts 65h is connected in parallel with capacitor 86.

In the operation of the circuitry, shown schematically in FIGURE 3, the following sequence of events occurs. The switch 25 closes temporarily each time one of the boxes 15 passes thereunder along the conveyor system 10. Assuming the off-on switch 52 is closed, closure of the switch 25 completes a circuit through the relay coil 65 to the source of power. Energizing the relay coil 65 causes all of the pairs of contacts assocated therewith to reverse. That is, the normally open contacts close and the normally closed contacts open. When the relay coil 65 is energized, the normally open contact 65a closes and a circuit is completed between the output leads 61 and 62 of the rectifying unit 56 through the normally closed contacts 80a, the jumper leads 77, the normally closed contact 71a, the contact 65a which has just closed, and the capacitor 70. Since the RC time of this circuit is very small, the capacitor 70 charges to the amplitude of the output voltage of the rectifying unit 56 very quickly. The contact 65b in series with the diode 72 and the relay coil 71, open when the relay coil 65 is energized, thereby removing the relay coil 71 from the parallel circuit with the capacitor 70. As the box 15 moves from beneath the switch 25, the switch 25 opens deenergizing the relay coil 65 and allowing the contacts associated therewith to return to their normal position. Thus, the pair of contacts 65a open breaking the series circuit, including the capacitor 70, between the leads 61 and 62. Simultaneously the pair of contacts 65b close connecting the relay coil 71 in parallel with the capacitor 70 and allowing the capacitor 70 to discharge through the pair of contacts 65b, the diode 72, and the relay coil 71. The capacitor 70 is sufficiently large to energize the relay coil 71 upon discharging therethrough, which energization causes the contacts associated with the relay coil 71 to change positions. Thus, when the capacitor 70 discharges through the relay coil 71, the contacts 71b associated therewith close completing a circuit from the output lead 61 through the normally closed contacts 67b, the normally closed contacts 68b, the contacts 71b which are now closed, and the relay coil 71 to the other output lead 62. Thus, the relay coil 71 is locked in the energized position. The normally open pair of contacts 71c are also closed and the normally closed pair of contacts 71a are opened with the energization of the relay coil 71.

When the next box 15 passes beneath the switch 25, the relay coil 65 is again energized and the pair of contacts 65c close while the pair of contacts 65d open. It should be understood that the remainder of the contacts associated with the relay coil 65 also change positions but, because of the other contacts in circuit therewith, these changes have no effect on the circuitry. When the pair of contacts 65c close, a circuit is completed from the output lead 61 through the normally closed contacts 80a, the jumper leads 77, the closed contacts 71c, the closed contact 65c and the capacitor 81 to the lead 62. Because of the low RC time in this series circuit, the capacitor 81 charges to the amplitude of the output of the rectifier unit 56 in a very short time. When the trailing edge of the box 15 passes from beneath the switch 25 the relay coil 65 is deenergized and the pair of contacts 65c open while the pair of contacts 65d close. The closure of the pair of contacts 65d completes a discharge path for the capacitor 81 through the pair of contacts 65d, the diode 82 and the relay coil 80. The capacitor 81 is of a sufficient size to energize the relay coil 80 as it discharges therethrough. Thus, the relay coil 80 is energized and the contacts associated therewith change positions. As the pair of contacts 80b associated with the relay coil 80 close, a circuit is completed from the output lead 61 through the normally closed contacts 67b, the normally closed contacts 68b, the contacts 80b and the relay coil 80 to the other output lead 62. Thus, the relay coil 80 is locked in the energized position. Since the relay coil 80 is energized, the pair of contacts 80a associated therewith open, and the pair of contacts 80c close.

As a third box 15 passes beneath the switch 25, the relay coil 65 is energized closing the pairs of contacts 65e and 65g, and opening the pairs of contacts 65f and 65h. Closure of the pair of contacts 65e completes a circuit from the output lead 61 through the closed contacts 80c, the normally closed contacts 66c, the closed contacts 65e and the capacitor 85 to the other output lead 62. The capacitor 85 charges to the amplitude of the output voltage of the rectifier unit 56 very quickly because of the low RC time in this circuit. As the trailing edge of the box 15 passes from beneath the switch 25, the relay coil 65 is deenergized and the contacts 65e open while the contacts 65f close. Closing the contacts 65f completes a discharge path for the capacitor 85 through the closed contacts 65f and the relay coil 68. The capacitor 85 has a sufficient charge thereon to energize the relay coil 68 as it discharges therethrough, which energization causes the normally open contacts 68a to close and the normally closed contacts 68b to open. Closing the contacts 68a completes a circuit from the lead 54 through the closed contacts 68a, the closed contacts 67a and relay coil 66 to the lead 55. Thus, the relay coil 66 is energized and the normally open contacts 66a close while the normally closed contacts 66b open, thereby, deenergizing the solenoid 41 and energizing the solenoid 40. This causes the gate 23 to move from the second position, illustrated in FIGURE 2, to the first position, thereby, allowing the boxes 15 to travel down the main line 11. It should be noted that the trailing edges of the boxes 15 actuate the circuit when they allow the switch 25 to open and deactivate the relay coil 65 and, therefore, the physical position of the switch 25 must be adjusted relative to the trailing edges of the boxes 15 so the gate 23 switches between the passage of the boxes 15 therethrough.

Since the normally closed contacts 68b open when the relay coil 68 is energized, the two relay coils 71 and 80 are unlocked or deenergized. The next box 15 to pass beneath the switch 25 causes the relay coil 65 to be energized, and the relay coil 71 to be locked in the energized position as previously described. As a fifth box 15 passes beneath the switch 25 the relay coil 80 is locked in the energized position, thereby, closing the contacts 80c. Since the relay coil 66 is still locked in the energized position, the contacts 66d are also closed and the sixth box to pass beneath the switch 25 causes the relay coil 67 to be energized, which opens the contacts 67a and deenergizes the relay coil 66. The pair of contacts 67b also open when the relay coil 67 is energized, and the relay coils 71 and 80 are again deenergized. Thus, after six boxes have passed beneath the switch 25 a cycle is completed and the circuitry is set to operate again exactly as described above. Thus, each time three boxes pass beneath the switch 25, the solenoids 40 and 41 alternate causing three of the boxes to pass down the main line 11, the next three boxes to pass down the branch line 12, the next three boxes to pass down the main line 11 again, etc.

While the circuit illustrated in FIGURE 3 has been described with the solenoids 40 and 41 alternating each time three of the boxes 15 pass beneath the switch 25, it should be noted that this circuit can be set so that the solenoids 40 and 41 alternate each time two or one of the boxes 15 pass beneath the switch 25. To alternate the solenoids 40 and 41 each time two of the boxes 15 pass beneath the switch 25, the jumper lead 77 should be removed from between the terminals 72 and 73 and placed beween the terminals 73 and 74. This effectively removes the relay coil 71 and its associated contacts from the circuitry. The circuit opeartes exactly as described above except that the relay coil 80 rather than the relay coil 71, is energized during the first cycle in which the switch 25 closes and opens. If it is desired to alternate the solenoids 40 and 41 each time one of the boxes 15 passes beneath the switch 25, the jumper lead 77 should be placed between the terminals 75 and 76 while the terminals 72, 73, and 74 remain unconnected. This effectively removes both of the relay coils 71 and 80 from the circuitry and the first cycle in which the switch 25 closes and opens causes the relay coil 68 to be energized, while the second cycle of the switch 25 causes the relay coil 67 to be energized. It should be understood that by adding additional circuitry to the circuit illustrated in FIGURE 3, one might alter the circuitry so that the solenoids 40 and 41 alternate for every fourth box 15, fifth box 15, sixth box 15, etc. which passes beneath the switch 25. Such a modification is well within the scope of this invention.

FIGURE 4 is a schematic presentation of a different embodiment of the present invention wherein parts similar to parts in FIGURE 3 are designated with a similar number, but a prime has been added to indicate a different embodiment. In FIGURE 4 the relay coils 65' and 66' are DC coils, while in FIGURE 3 the coils 65 and 66 are AC coils. Because of this modification, two extra pairs of contacts 66e and 66f, associated with the relay coil 66', are utilized. The operation of the circuit illustrated in FIGURE 4 is substantially similar to the operation of the circuit illustrated in FIGURE 3.

While I have shown and described a specific embodiment of this invention, further modifications and improvements will occur to those skilled in the art. I desire it to be understood therefore, that this invention is not limited to the particular form shown, and I intend in the appended claims to cover all modifications which do not depart from the spirit and scope of this invention.

I claim:
1. Control apparatus comprising:
   (a) condition responsive means adapted to temporarily complete an electric circuit upon each occurrence of a prescribed condition;
   (b) transducer means adapted to be connected to a suitable source of power in a first configuration to provide a first activating impulse and to be connected to the source of power in a second configuration to provide a second activating impulse; and
   (c) relay means connected to the source of power, to said condition responsive means through said electric circuit, and to said transducer means and including a plurality of relays each having a plurality of contacts connected to operate in one of a predetermined series of sequences each time the condition responsive means operates for alternately connecting said transducer means to the source of power in said first configuration and for connecting said transducer means to the source of power in said second configuration each time said electric circuit is completed a predetermined number of times.

2. Control apparatus as set forth in claim 1 wherein the transducer means includes a first and second solenoid connected so that said first solenoid is energized and said second solenoid is deenergized in the first configuration and said first solenoid is deenergized and said second solenoid is energized in said second configuration.

3. Control apparatus as set forth in claim 1 wherein the plurality of relays and the associated contacts are connected in circuit with a plurality of terminals which are adapted to be connected in a variety of configurations for varying the required number of times the electric circuit must be completed to change the connecting configuration of the transducer means to the source of power.

4. Control apparatus as set forth in claim 1 having in addition conveying means associated therewith including a main line and a branch line, the condition responsive means being mounted to sense objects as they pass along said conveying means prior to said branch line and complete the electric circuit upon the passage of each object thereby, and said transducer means being mounted adjacent the branch lines and having means associated therewith for diverting objects onto said branch line each time the transducer means is connected in the second configuration and allowing objects to pass along said main line when said transducer means is connected in the first configuration.

5. A locking circuit for relays and the like comprising:
 (a) input means adapted to be connected to a suitable source of power;
 (b) a first relay having condition responsive means in circuit therewith for temporarily connecting said relay in circuit with said input means, said relay having a set of normally open contacts and a set of normally closed contacts;
 (c) a second relay having a set of normally open contacts and a set of normally closed contacts;
 (d) electrical power storage means having a storage capacity sufficient to temporarily energize said second relay when properly connected thereto;
 (e) means connecting said normally open contacts of said first relay and said normally closed contacts of said second relay in series with said power storage means and said input means;
 (f) means including a unidirectional current device connecting said second relay in series with the normally closed set of contacts of said first relay and in parallel with said power storage means;
 (g) means connecting said normally open set of contacts of said second relay in series with said second relay and said input means; and
 (h) whereby upon connection of said input means to a suitable source of power and temporary connection of said first relay thereto by said condition responsive means said second relay is locked in the energized position as said first relay is deenergized.

References Cited

UNITED STATES PATENTS

| | | | |
|---|---|---|---|
| 1,881,514 | 10/1932 | Keller et al. | 198—40 XR |
| 2,558,751 | 7/1951 | Hebert | 198—78 |
| 2,580,834 | 1/1952 | Prescott | 317—139 XR |
| 2,670,835 | 3/1954 | Huttmann. | |
| 2,728,466 | 12/1955 | Postlewaite et al. | 198—40 XR |
| 3,011,621 | 12/1961 | Byrnes et al. | 198—78 |
| 3,254,752 | 6/1966 | Bauch et al. | |
| 3,350,581 | 10/1967 | Stein | 317—151 XR |

LEE T. HIX, Primary Examiner

W. M. SHOOP, Jr., Assistant Examiner

U.S. Cl. X.R.

198—31, 81; 317—139